United States Patent
Park et al.

(10) Patent No.: US 10,351,450 B2
(45) Date of Patent: Jul. 16, 2019

(54) BALLAST WATER TREATMENT SYSTEM BY USING NADCC

(71) Applicant: TECHCROSS INC., Seoul (KR)

(72) Inventors: Kyuwon Park, Seoul (KR); Seongtae Kim, Seoul (KR); Haidon Lee, Seoul (KR); Gwangho Lee, Seoul (KR)

(73) Assignee: TECHCROSS INC., Seoul (KR)

( * ) Notice: Subject to any disclaimer, the term of this patent is extended or adjusted under 35 U.S.C. 154(b) by 341 days.

(21) Appl. No.: 15/165,545

(22) Filed: May 26, 2016

(65) Prior Publication Data

US 2016/0355422 A1    Dec. 8, 2016

(30) Foreign Application Priority Data

Jun. 3, 2015 (KR) .................. 10-2015-0078300

(51) Int. Cl.
```
C02F 1/68      (2006.01)
B63J 4/00      (2006.01)
C02F 1/76      (2006.01)
C02F 103/00    (2006.01)
```
(52) U.S. Cl.
CPC ............ *C02F 1/686* (2013.01); *B63J 4/002* (2013.01); *C02F 1/76* (2013.01); *C02F 1/688* (2013.01); *C02F 2103/008* (2013.01); *C02F 2209/05* (2013.01); *C02F 2209/42* (2013.01); *C02F 2303/04* (2013.01)

(58) Field of Classification Search
None
See application file for complete search history.

(56) References Cited

U.S. PATENT DOCUMENTS

| | | | | |
|---|---|---|---|---|
| 3,886,249 A | * | 5/1975 | Manganaro | C11D 1/00 264/118 |
| 4,208,376 A | * | 6/1980 | Sangster | C02F 1/24 137/268 |
| 4,861,489 A | * | 8/1989 | Swift | C02F 1/42 210/167.3 |
| 5,660,802 A | * | 8/1997 | Archer | C02F 1/505 137/268 |
| 2001/0004962 A1 | * | 6/2001 | Hirota | C02F 1/46104 204/228.1 |
| 2009/0152211 A1 | * | 6/2009 | Crits | A61L 2/04 210/774 |

* cited by examiner

*Primary Examiner* — Richard C Gurtowski
(74) *Attorney, Agent, or Firm* — Patent Office of Dr. Chung Park

(57) ABSTRACT

Provided is a ballast water treatment apparatus by using sodium dichloroisocyanurate. The ballast water treatment apparatus includes: a cartridge that is provided with an inlet and an outlet in order that a fresh water is introduced and discharged, that is provided with an inlet valve and an exhaust valve installed in the inlet and the outlet respectively, and that is equipped with the sodium dichloroisocyanurate; and a dissolution tank that is equipped with a agitator configured to be connected to the outlet of the cartridge to agitate the sodium dichloroisocyanurate.

8 Claims, 2 Drawing Sheets

BALLAST WATER TREATMENT SYSTEM BY USING NADCC

CROSS-REFERENCE TO RELATED APPLICATION

The instant application claims priority to Korean Patent Application Serial No. 10-2015-0078300, filed Jun. 3, 2015, the entire specification of which is expressly incorporated herein by reference.

FIELD OF THE INVENTION

The present disclosure relates to a ballast water treatment system by using sodium dichloroisocyanurate (hereinafter referred to as "NaDCC"), and more particularly, to a ballast water treatment system by using NaDCC that enables it to safely handle NaDCC of a granule type.

BACKGROUND OF THE INVENTION

In general, most cargo ships in maritime transport, excluding ships that perform a return voyage so as to exchange similar goods, perform one-way operation.

During the return voyage after one-way operation with full load condition, ballast water should be introduced into a ship so as to implement a balance of the ship, a safety, and an improved ship maneuverability, so that it is possible to leave on a voyage in a ballast condition.

In this case, the ballast water is filled from a harbor and is transported to a new harbor of other place where the ballast water is discharged. Thus, the release of marine organism and pathogen contained in the ballast water carried from distant location may be dangerous to both people and animal in the new harbor as well as harmful to a new environment.

When non-natural marine life is introduced into a new ecosystem, it may cause a devastating effect to natural flora and fauna that may not have a natural defense system against new species. In addition, harmful bacterial pathogens, such as cholera, may exist in the original harbor. Such a pathogen may be proliferated in a ballast tank over time, so that disease may break out in an area where the pathogen is released.

A risk posed by such marine life and pathogens may be controlled by killing the above species existing in the ballast water.

An electrolytic method that treats ballast water by using sodium hypochlorite generated by electrolyzing sea water is widely used for the method for killing organisms.

However, because the treating of the ballast water by using the above mentioned electrolytic method should convert NaCl contained in seawater into NaClO, this treating of the ballast water is easy in a sea water area, but when a ship sails in a freshwater area such as river (in particular, in an area where salt concentration is 0.5 psu or less), it is impossible to use the electrolytic method.

Alternatively, in addition to the electrolytic method, in order to maintain the efficiency of the ballast water treatment in a freshwater area, there is a method of killing the ballast water through an injection of a chemical, such as a germicide.

Because NaDCC is cheap and has a strong sterilizing power among the germicides, it is widely used in a sterilization treatment.

However, NaDCC should be treated very carefully, as it causes a severe stimulus to the eyes, is toxic if breathed in, and is harmful if swallowed.

Also, because an aqueous solution type NaDCC has a large volume and is degraded according to temperature, a suitable place where it can be used is limited and it is hard to treat a large amount for proper storage.

Additionally, a granule type NaDCC has handling difficulty because it is easily scattered in the form of dust. Therefore, when supplementing the granule type NaDCC, an expert who is equipped with safety equipment should perform the operation, thus leading to longer operation times. Furthermore, because the NaDCC dust is liable to be scattered, a separate ventilator is needed such that the overall system becomes more complex and larger.

SUMMARY OF THE INVENTION

The present disclosure has been made in view of the above problems, and provides a ballast water treatment apparatus by using NaDCC that enables it to handle more easily a granule type NaDCC.

In accordance with an aspect of the present disclosure, a ballast water treatment apparatus by using NaDCC includes: a cartridge that is provided with an inlet and an outlet in order that a fresh water is introduced and discharged, that is provided with an inlet valve and an exhaust valve installed in the inlet and the outlet respectively, and that is equipped with the sodium dichloroisocyanurate; and a dissolution tank that is equipped with a agitator configured to be connected to the outlet of the cartridge to agitate the sodium dichloroisocyanurate.

A plurality of the cartridges is connected in parallel.

The cartridge comprises a transparent window in a side to determine whether the equipped NaDCC is being used and/or has been used up.

A capacity of the cartridge and the dissolution tank is determined to achieve a solubility of 4%, 8% or 12% of the sodium dichloroisocyanurate.

The dissolution tank is equipped with a conductivity sensor to measure conductivity of the dissolved sodium dichloroisocyanurate.

The inlet valve and the exhaust valve are a manual valve.

An auto-inlet valve is installed in an inlet side of the inlet valve, and an auto-discharge valve is installed in a discharge side of the exhaust valve.

The dissolution tank is provided with a cooling unit installed in an outside.

The dissolution tank is provided with a level sensor configured to measure a water level, and the ballast water treatment apparatus further includes a controller configured to open and/or close the auto-inlet valve and the auto-discharge valve depending on a water level signal transmitted from the level sensor.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF THE INVENTION

Exemplary embodiments of the present disclosure are described with reference to the accompanying drawings in detail. Detailed descriptions of well-known functions and structures incorporated herein may be omitted to avoid obscuring the subject matter of the present disclosure.

Figure 1:
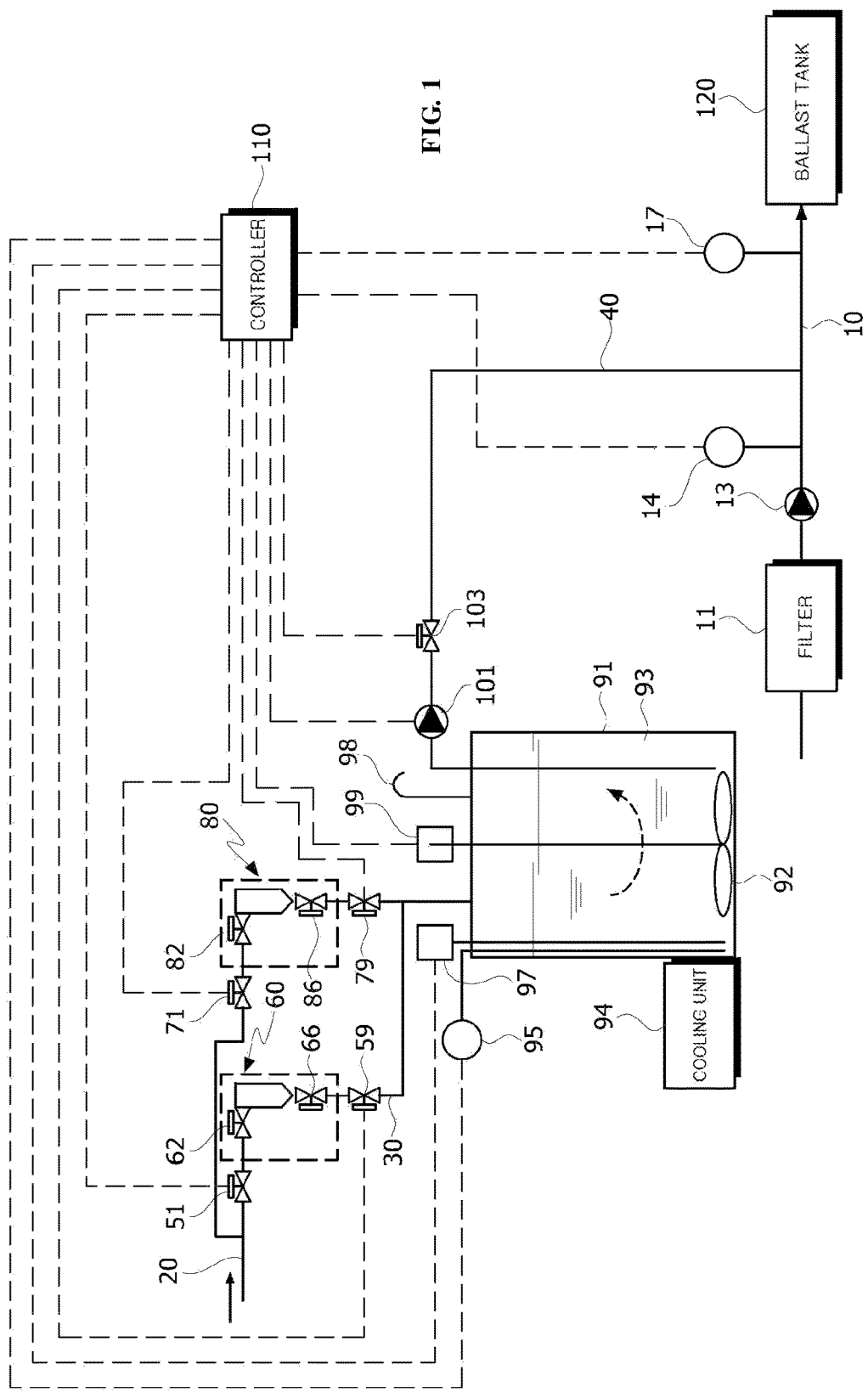
FIG. 1 is a schematic diagram illustrating a configuration of a ballast water treatment apparatus by using NaDCC, according to an embodiment of the present disclosure.
Figure 2:
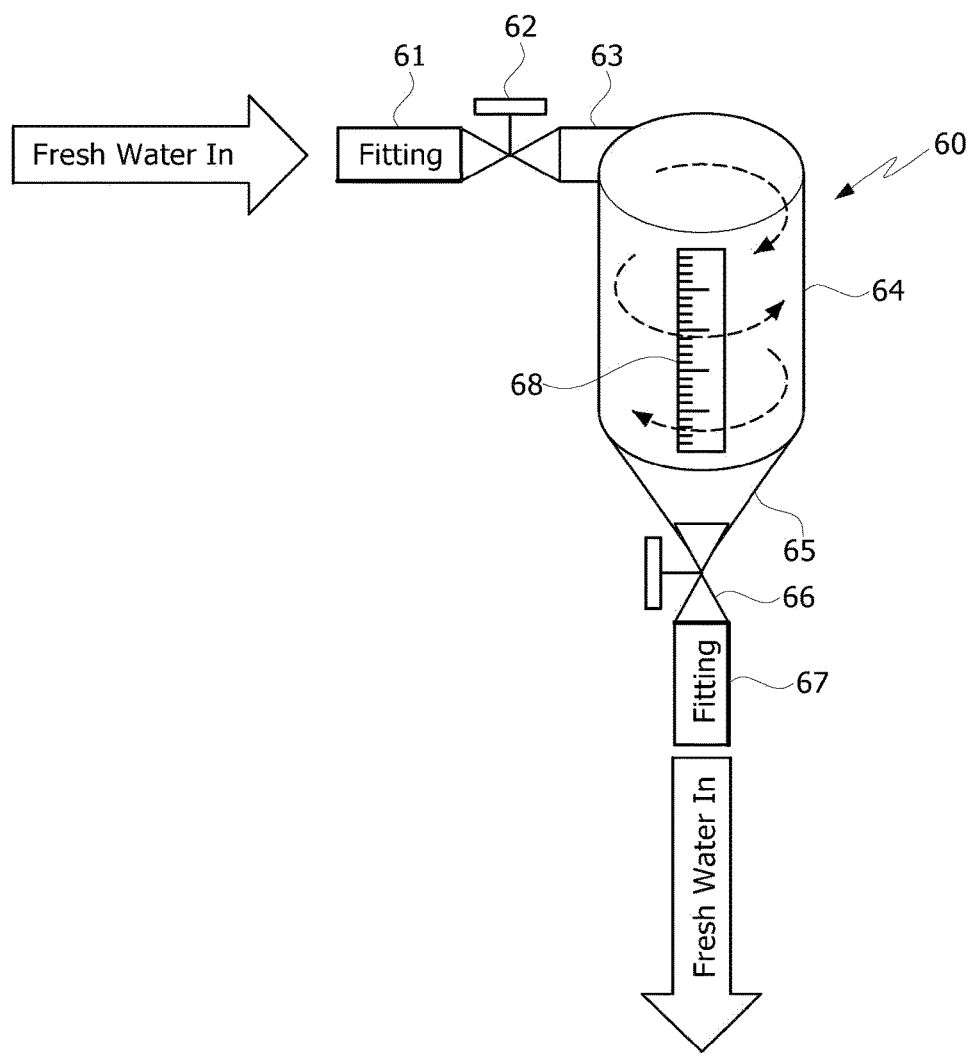
FIG. 2 is a schematic diagram illustrating a NaDCC injection apparatus provided in a ballast water treatment apparatus by using NaDCC, according to an embodiment of the present disclosure.

FIG. 1 is a schematic diagram illustrating a configuration of a ballast water treatment apparatus by using NaDCC according to an embodiment of the present disclosure, and FIG. 2 is a schematic diagram illustrating a NaDCC injection apparatus provided in a ballast water treatment apparatus by using NaDCC according to an embodiment of the present disclosure.

Referring to FIG. 1, the ballast water treatment apparatus by using NaDCC, according to an embodiment of the present disclosure, may be an apparatus for treating ballast water by injecting an oxidant solution into the ballast water introduced into a ballast tank 120 along a main pipe 10 for ballast water of ship. The used oxidant may perform a sterilization treatment for the ballast water by using a hypochlorite (HClO) that is generated by dissolving the NaDCC in water.

In detail, the ballast water treatment apparatus by using NaDCC, according to an embodiment of the present disclosure, may include the main pipe 10, a suction pump 13, a total residual oxidant (hereinafter referred to as "TRO") sensor 17, a fresh water supply pipe 20, a cartridge 60 equipped with NaDCC and a dissolution tank 91.

The suction pump 13 may be a pump for introducing the ballast water to the ballast tank 120 through the main pipe 10 to store the ballast water in the ballast tank 120.

The ballast water treatment apparatus, according to an embodiment of the present disclosure, may be provided with a filter to filter a foreign object or a large-sized microorganism included in the ballast water introduced into a front-side of the suction pump 13. If necessary, the filter 11 may be omitted.

A flow meter 14 may be installed on the discharge side of the suction pump 13 to measure the flow rate of the water introduced through the suction pump 13.

The TRO sensor 17 may be installed on the main pipe 10 after an oxidant injection pipe 40 is joined with the main pipe 10 for ballast water so as to measure the TRO concentration of the ballast water after the oxidant is injected.

The fresh water supply pipe 20 may be installed to connect a fresh water supply unit (not shown) with the NaDCC cartridges 60 and 80 so that the fresh water may be introduced into the NaDCC cartridges 60 and 80.

The NaDCC cartridge 60 may be provided with a granule type NaDCC and, as shown in FIG. 2, may include an inlet fitting unit 61 that is connect with the fresh water supply pipe 20 so that fresh water may be introduced and be discharged after being mixed with NaDCC, and a discharge fitting unit 67 that is connected to a dissolution tank connection pipe 30.

The NaDCC cartridge 60 may include a body 64 having a cylindrical shape, an inlet 63 formed on the side of a top of the body 64 to guide the inflow of fresh water, and an outlet 65 of a funnel shape formed at the bottom of the body 64 to discharge aqueous solution obtained by mixing the fresh water with NaDCC.

Here, the NaDCC cartridge 60 may be provided with a separate injection unit to inject the granule type NaDCC, but may inject the granule type NaDCC through the above inlet 63.

In addition, the NaDCC cartridge 60 may be closed so that built-in NaDCC may not be leaked for a separate keeping or during movement to the outside for mounting and, after being mounted to a cartridge mounting unit of the ballast water treatment apparatus, may be provided with an inlet valve 62 and an exhaust valve 66 that are opened to enable to accomplish the inflow of fresh water and the discharge of NaDCC aqueous solution.

The NaDCC the cartridge 60 may be provided with a transparent window 68 on the side of the body 64 to identify the amount and/or level of used built-in NaDCC, of a granule type, to determine replacement time. At this time, gradation may be formed on the transparent window 68 to measure the stored capacity and/or used capacity. When replacing the cartridge 60, separate protective equipment may not be needed even if the NaDCC is left in the cartridge 60 because there is no dust as the NaDCC is not in a powder state but in a paste state.

A plurality of the ballast water treatment apparatus by using NaDCC according to an embodiment of the present disclosure may be connected in parallel to be installed, as shown in FIG. 1, to supply a large amount of oxidant. Although two cartridges 60 and 80 are installed in parallel in the drawing, it is also possible to provide additional cartridges in parallel when an oxidant for a larger capacity is required. Such a configuration may be effective in terms of maintenance because an appropriate number of cartridges can be installed to meet the needs of the ship of various sizes, and it is also possible to replace the module upon failure.

The dissolution tank 91 may be connected by the NaDCC cartridge 60, 80 and the dissolution tank connection pipe 30 so that the NaDCC aqueous solution may be introduced.

Here, the dissolution tank 91 may be equipped with an agitator 99 having a blade unit 92 for agitating the NaDCC aqueous solution so that the NaDCC aqueous solution may be completely dissolved.

In addition, a conductivity sensor 95 may be installed to measure the conductivity of the dissolved NaDCC aqueous solution.

Here, the capacity of the cartridge 60, 80 and the dissolution tank 91 may be determined in such a manner that the solubility of NaDCC becomes 8%. The solubility of NaDCC is 22.7%, but, preferably, 8% when considering dissolving time and complete dissolving. For example, if the capacity of the dissolution tank 91 is 50 L, the capacity of cartridge 60, 80 is designed to be 4 Kg. In addition, the capacity of the cartridge 60, 80 and the dissolution tank 91 may be determined in such a manner that the solubility becomes 4% and/or 12% by assigning upper and lower margins based on the solubility of 8%.

Next, the agitator 99 may operate about 20 minutes after the dissolution tank 91 is supplemented with the NaDCC aqueous solution. The conductivity may increase as the NaDCC is more dissolved, and the conductivity becomes 24 mS/cm2 when it is completely dissolved 8%. Thus, when using the conductivity sensor 95, it is possible to shorten the agitation time by determining whether it is fully dissolved.

Meanwhile, the dissolution tank 91 may be provided with a level sensor 97 to measure a water level of the NaDCC aqueous solution. When the level sensor 97 is a low level state, auto-inlet valve 51, 71 and auto-discharge valve 59, 79 may be opened to supply fresh water into the cartridge 60, 80, and the NaDCC in the cartridge 60, 80 may be transferred to the dissolution tank 91 by the fresh water. The fresh water may be supplied until the level sensor 97 reaches a high level state, and, after reaching the high level state, the auto-inlet valves 51, 71 and/or the auto-discharge valve 59, 79 may be closed.

Further, the dissolution tank 91 may be provided with an air vent 98 to introduce and discharge the NaDCC solution smoothly.

Further, a cooling unit may be provided in the outside to prevent degradation according to the temperature of the NaDCC aqueous solution.

Meanwhile, the auto-inlet valves 51, 71 may be installed in the introducing side of the inlet valve 62, 82 respectively, and the auto-discharge valves 59, 79 may be installed in the discharging side of the discharge valves 66, 86 respectively.

Here, the inlet valve 62, 82 and the exhaust valve 66, 86 may be configured of a manual valve. In the ballast water treatment apparatus according to an embodiment of the present disclosure, the inlet valve 62, 82 and the exhaust valve 66, 86 are a means for preventing the built-in NaDCC from being leaked to the outside. In order to replace the above valve, a protection film (not shown) may be provided to the inlet unit and the exhaust unit.

If the protection film (not shown) is configured to be destroyed when the cartridge is coupled to a connection pipe, it may perform a sealing function of the inlet valve and the exhaust valve of the present disclosure. However, in this case, it is disadvantages in that the cartridge cannot be recycled. Therefore, it is preferable that the built-in NaDCC is sealed by the valve.

A dosing pump 101 may be provided between a control valve 103 and the dissolution tank 91 so that an oxidant solution 93 where the NaDCC is dissolved may be joined to the main pipe 10 through the oxidant injection pipe 40, and perform a function of controlling and injecting the oxidant solution 93 as a fixed capacity.

A controller 110 may receive a signal from various sensors to operate a pump, and/or perform a function of opening and closing the valve.

As shown in FIG. 1, a signal relating to the level of the dissolution tank 91 may be received from the level sensor 97 to generate a control signal for opening and/or closing the auto-inlet valves 51, 71 and the auto-discharge valves 59, 79.

In addition, the controller 110 may receive the TRO concentration value of the ballast water from the TRO sensor 17 to determine the amount of input of the oxidant 91, and then, adjust the rotation speed of the dosing pump 101 and/or the opening degree of the control valve 103, and/or control the dosing pump 101 and the control valve simultaneously to generate a control signal for determining the amount of input of the oxidant 91.

In addition, the controller 110 may receive conductivity information of the NaDCC aqueous solution in the dissolution tank 91 to determine whether complete dissolution is achieved based on the conductivity information, and then, generate a control signal for stopping the operation of the agitator 99 if complete dissolution is achieved.

This may prevent unnecessary agitation operation, and it is possible to perform the agitation operation in an optimal time.

Hereinafter, the process of the above described operation of the present disclosure is described.

First, the cartridge 60, 80 equipped with the granule type NaDCC may be mounted in the ballast water treatment apparatus. It may be moved in the state in which the inlet valve 62, 82 and the discharge valve 66, 86 are closed before mounting, and the state of manually opening the inlet valve 62, 82 and the discharge valve 66, 86 may be maintained after mounting.

After the NaDCC cartridge 60, 80 is mounted, when the suction pump 13 operates, sea water may be introduced into the inside of the ship through sea chest and transferred to the ballast tank 120 along the main pipe 10.

In order to inject the oxidant, fresh water may be supplied to the cartridge 60, 80 so that the NaDCC aqueous solution is introduced into the dissolution tank 91.

In this case, the auto-inlet valves 51, 71 and the auto-discharge valves 59, 79 may be opened so that the fresh water and the NaDCC aqueous solution may be transferred.

Thereafter, after the NaDCC aqueous solution of the dissolution tank 91 is completely dissolved, it may be joined to the main pipe 10 through the oxidant injection pipe 40 to inject the oxidant.

Next, the TRO concentration of the ballast water to which oxidant is introduced may be measured in the TRO sensor 17, and the measured TRO concentration information may be transmitted to the controller 110.

The controller 110 may control the dosing pump 101 and/or the control valve 103 and adjust the amount of the NaDCC aqueous solution in order to satisfy a certain TRO concentration level. In addition, it performs a control to open and close the auto-inlet valves 51, 71 and the auto-discharge valves 59, 79 according to the level state of the dissolution tank 19. That is, in the low level state, the auto-inlet valves 51, 71 and the auto-discharge valves 59, 79 may be opened to supplement the dissolution tank 91 with the NaDCC aqueous solution. In the high level state, the auto-inlet valves 51, 71 and the auto-discharge valves 59, 79 may be closed to stop the introducing of the NaDCC aqueous solution.

Through this operation, the ballast water having a certain TRO concentration may be introduced into the ballast tank 120, thereby sterilizing the microorganisms in the ballast water.

The ballast water treatment apparatus by using NaDCC according to an embodiment of the present disclosure is not limited to the processing of the ballast water, but may be applied to a sterilization apparatus for sterilizing aquatic organisms in various water treatments such as household water machines and/or water treatment facilities, sewage/waste water treatment plants and/or the like.

According to an embodiment of the present disclosure, a granule type NaDCC may be mounted in the interior of the cartridge, so that the NaDCC is not scattered and safely supplied.

In addition, according to an embodiment of the present disclosure, a plurality of the cartridges containing a granule type NaDCC is mounted in parallel, so that a large amount of NaDCC may be supplied.

In addition, according to an embodiment of the present disclosure, an opening and closing valve may be installed in the inlet side and the discharge side of the cartridge provided with a granule type NaDCC so that the built-in NaDCC may be prevented from being leaked to the outside and a separate ventilator may not be required.

In addition, according to an embodiment of the present disclosure, an automatic valve may be installed in the inlet side and the discharge side of the cartridge provided with NaDCC so that a desired amount of NaDCC may be supplied to the dissolution tank.

In addition, according to an embodiment of the present disclosure, a transparent window may be included on the side of the cartridge provided with NaDCC so that it is possible to determine whether the built-in NaDCC is being used and/or has been used up.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A ballast water treatment apparatus using sodium dichloroisocyanurate, comprising:
    a cartridge that includes the sodium dichloroisocyanurate with a granule type, provided with a first pipe and a second pipe in order that a source of fresh water is operable to be introduced in the first pipe and discharged from the second pipe;
    an auto-inlet valve installed in the first pipe and an auto-discharge valve is installed in the second pipe;
    an inlet valve that is located between the auto-inlet valve and the cartridge, installed in the first pipe, and an exhaust valve that is located between the cartridge and the auto-discharge valve, installed in the second pipe;
    a dissolution tank that includes an agitator configured to be connected to an outlet of the cartridge to agitate and dissolve the sodium dichloroisocyanurate, forming a sodium dichloroisocyanurate aqueous solution, and a conductivity sensor to measure a conductivity of the dissolved sodium dichloroisocyanurate therein;
    a level sensor configured to measure a water level of sodium dichloroisocyanurate aqueous solution included into the dissolution tank; and
    a controller configured to open or close the auto-inlet valve and the auto-discharge valve depending on a water level signal transmitted from the level sensor,
    a third pipe that supplies an oxidant solution of the dissolved sodium dichloroisocyanurate to a ballast tank from the dissolution tank;
    a control valve installed in the third pipe to control an amount of the oxidant solution of the dissolved sodium dichloroisocyanurate;
    a fourth pipe that connects to a side of the third pipe and supplies ballast water to the ballast tank; and
    a total residual oxidant sensor installed in the fourth pipe to determine a total residual oxidant concentration of the ballast water,
    wherein the controller allows the control valve to control the amount of the oxidant solution of the dissolved sodium dichloroisocyanurate according to a total residual oxidant concentration from the total residual oxidant sensor.

2. The apparatus of claim 1, wherein the cartridge includes a plurality of the cartridges and the plurality of the cartridges are connected in parallel to the first pipe and the second pipe.

3. The apparatus of claim 1, wherein the cartridge includes a transparent window in a side thereof to determine an amount of the sodium dichloroisocyanurate contained therein.

4. The apparatus of claim 1, wherein a solubility of the sodium dichloroisocyanurate included in the cartridge and the dissolution tank ranges from 4% to 12%.

5. The apparatus of claim 1, wherein the inlet valve and the exhaust valve are a manual valve.

6. The apparatus of claim 1, wherein the dissolution tank is provided with a cooling unit installed on an outside surface thereof.

7. The apparatus of claim 1, wherein the dissolution tank includes an air vent to introduce or discharge an oxidant solution of the sodium dichloroisocyanurate.

8. The apparatus of claim 1, wherein the cartridge includes a body having a cylindrical shape, an inlet formed on a side of the body and an outlet that has a funnel shape, formed at a bottom of the body.

* * * * *